United States Patent
Parla et al.

(10) Patent No.: US 7,398,530 B1
(45) Date of Patent: Jul. 8, 2008

(54) METHODS AND APPARATUS FOR EVENT HANDLING

(75) Inventors: Vincent E. Parla, North Hampton, NH (US); Peter J. Moss, Bedford, MA (US); Kevin J. Bergquist, Carlisle, MA (US)

(73) Assignee: Cisco Technology, Inc., San Jose, CA (US)

( * ) Notice: Subject to any disclaimer, the term of this patent is extended or adjusted under 35 U.S.C. 154(b) by 667 days.

(21) Appl. No.: 10/044,213

(22) Filed: Nov. 20, 2001

(51) Int. Cl.
*G06F 3/00* (2006.01)
*G06F 11/00* (2006.01)

(52) U.S. Cl. .......................... 719/318; 714/2; 714/25; 714/48

(58) Field of Classification Search ............... 707/1–10; 709/201–253; 719/318; 714/1–57
See application file for complete search history.

(56) References Cited

U.S. PATENT DOCUMENTS

| | | | |
|---|---|---|---|
| 6,167,448 A * | 12/2000 | Hemphill et al. | 709/224 |
| 6,526,442 B1 * | 2/2003 | Stupek et al. | 709/224 |
| 6,594,786 B1 * | 7/2003 | Connelly et al. | 714/50 |
| 6,779,004 B1 * | 8/2004 | Zintel | 709/227 |
| 6,789,257 B1 * | 9/2004 | MacPhail | 719/316 |
| 6,898,737 B2 * | 5/2005 | Goeller et al. | 714/39 |
| 2004/0205689 A1 * | 10/2004 | Ellens et al. | 717/100 |

* cited by examiner

*Primary Examiner*—William Thomson
*Assistant Examiner*—Charles E Anya
(74) *Attorney, Agent, or Firm*—Chapin IP Law, LLC; Barry W. Chapin, Esq.

(57) ABSTRACT

The invention is directed to techniques for receiving an event message, identifying event information required to process event data based on the event message, based on the event information, determining if existing event information is accessible to process the event data and if the existing event information is not accessible, providing an event rejection indicating missing event information and receiving the missing event information identified in the event rejection but if the existing event information is not accessible, providing an event rejection indicating missing event information and receiving the missing event information identified in the event rejection.

42 Claims, 7 Drawing Sheets

METHODS AND APPARATUS FOR EVENT HANDLING

BACKGROUND OF THE INVENTION

Computers and computer networks are often multi-component systems that are subject to a variety of hardware and software events such as errors or failures of different origins. In such systems, it is often desirable to be able to monitor or collect events that occur in order to be able to diagnose problems associated with systems. In particular, many computer network systems may be very complex and may include both hardware and software components for which events are to be monitored. As an example, the computer systems and network components may be critical to important operational functions of high reliability systems. These and other situations have resulted in the development of tools and techniques for monitoring events such as system or component failures. Two of such conventional mechanisms for monitoring events are the simple network management protocol (SNMP) and phone home event reporting systems.

The simple network management protocol (SNMP) is a software system and protocol that uses SNMP agent software operating on one or more computerized devices to identify certain computer and/or network related events and report these events to a network management server computer system operated by support technicians or other individuals for problem resolution. In particular, SNMP can report hardware and software events such as errors, problems, and pre-determined operational characteristics, etc. to the management server. The SNMP agent runs on each system component that is to be monitored in order to collect data regarding that system component. An SNMP server collects data provided by the agents about the computer systems, networks, software, etc. being monitored and can provide simple commands back to the SNMP agent in order to adjust operational characteristics of the system component. The data to be collected is identified and stored in a management information base (MIB).

Another system for reporting hardware and software events, is referred to as a "phone home" system. This type of system allows a computer system experiencing a problem to dial out over a telephone line to a support server in order to communicate event-related information regarding the problem. The support server can be monitored by support personnel in order to diagnose the problem reported using the phone home technique.

SUMMARY OF THE INVENTION

Unfortunately, there are deficiencies in the conventional techniques and mechanisms for managing system problems. Due to the complexity of computer and network systems neither SNMP nor "phone home" provide adequate tools for monitoring events. Although SNMP can identify and report problems and events, it has limited capability for interpreting or analyzing specific events or problems. SNMP does not provide the ability to identify or analyze the hierarchical relationships between events or maintain and use state information. Nor does SNMP have the ability to provide operators monitoring SNMP reports with any advice or assistance about actual problem resolution. Most of the analysis of problems and events that is necessary for diagnosis and resolution of problems must be undertaken by operators on a manual basis. Furthermore, conventional techniques and mechanisms for reporting errors or event information are ineffective at taking full advantage of the opportunity to use events with similar or related causes as a diagnostic tool. In other words, conventional error reporting systems cannot correlate different events in order, for example, to deduce the origination of a specific problem or event.

Another disadvantage of conventional techniques and mechanisms for event reporting is that existing systems operate as closed systems that are able to respond only to system events that have been pre-defined and/or pre-programmed into the event sending and receiving components of the system (e.g., an SNMP agent and server, or a phone home system). This inflexibility, makes it difficult to support error reporting for existing systems at the same time as a new system or systems for which enhancements are being implemented. For example, if a new version of a software program is installed that uses a different error message or error messages than the error message or messages already identified to an SNMP agent and server, the management information base (MIB) of the SNMP system will have to be upgraded before the system would be able to respond to any new error message. Unfortunately it is a fairly manual and complex task to keep the MIB up-to-date each time that a new system component is added or upgraded. This inflexibility of a conventional event handling system is particularly cumbersome when users or customers elect to obtain their technical support and event handling from third party, centralized, automated or semi-automated, or off-site system and event support facilities.

Another disadvantage of conventional mechanisms and techniques with respect to users of third party, centralized, automated or semi-automated, or off-site event support facilities is that in such arrangements, it may be difficult or impossible to provide a communications channel between the host and/or supported systems, the event information component (e.g., MIB or management information base in the case of SNMP), event processing server (e.g., support server) and the output device (e.g., monitoring agent), and the like if a shared communications channel (e.g., such as a local area network, wide area network, etc.) does not exist between those system components or if the event monitoring system is not designed to operate using the communications protocols with which the user's system is equipped.

Conventional systems that have the ability to dial-up or "phone home" to an event processing server (e.g., support server) whenever a problem, error message or other event must be reported require a dedicated phone line and must be specifically set-up and configured for the specific location, communications facilities available, telephone number, etc. In addition, the initial database of the customer facilities, systems, devices, etc. must be predefined prior to event monitoring taking place.

Furthermore, event monitoring tools may be unable to monitor events in computer systems and/or networks operating within certain multiple-platform environments. For example, a company that is using a Windows-based SNMP monitoring system may not be able to monitor certain Linux®-based system events within the Windows SNMP system due to the use of nonstandard MIB's.

Embodiments of the invention are directed to techniques and mechanisms that provide greater flexibility and additional capabilities for event monitoring, reporting and handling and significantly overcome these and other problems of conventional error or event reporting systems. In embodiments of the invention, event information (e.g., company, product, module, help, event ID, message mapping, substitution mappings, hierarchical, chart templates, rules, etc., such as XML templates) is maintained within a storage facility connected to an event processing server and is used to process event data. Sources of event data (e.g., hardware or software programs generating a hardware error message, alarm events, system status message, software program failure report message, etc.) can produce events which are detected by an event generation process operating in conjunction with the source of event data. The event generation process can communicate with the event processing server to report the event, such as by using XML to transmit the event data to the event processing server. Upon receipt of event data notifying the event processing server of the occurrence of such an event, the event processing server can process the event data using stored event information (e.g., XML documents) to determine how to interpret, manage or handle the event data.

As part of developing a new product, the product developer integrates event information into the product. When the product is put into service, the product automatically sends event information to the event processing server updating the existing event information. Therefore no advance knowledge or manual interaction is required. Although the initial installation of the system may include an initial installation of event information, additional event information may be dynamically added to the storage facility of event information. When the event generation process begins operation of monitoring event sources for event data, the event generation process can perform a registration operation with the event processing server. During the registration process, event generation process can provide registration information to the event processing server that indicates, for example, a specific company, product, module (e.g., software module) or other information that identifies a source or sources of forthcoming event data as well as event information that the event processing server will require in order to be able to correctly process the forthcoming event data. In other words, the event generation client can pre-register itself with the event processing server to indicate which product areas events will be reported within and what event information the event processing server will require to be able to properly interpret the event data reported in those product areas. Upon receiving event registration information, the event processing server can perform a check to ensure that the event information identified within the event registration information is available for access by the event processing server. If the event processing server determines that it does not currently have access to the event information identified in the event registration information, the event processing server can provide an event rejection back to the event generation process indicating any missing event information that the event processing server does not currently have access to. In response, the event generation process can provide the missing event information back to the event processing server in the form of event information documents such as XML documents. In this manner, embodiments of the invention allow an event generation process to specify what event information the event processing server will require in order to properly process event data. Accordingly, the event processing server can dynamically "learn" how to process events as they are generated without the need to manually update a management information base or other database.

Alternatively, in other embodiments, no pre-registration is required. In such cases, the event generation process can begin reporting event data to the event processing server upon detection of the first event without first registering with the event processing server. Upon receipt of event data by the event processing server, if event information required by the event processing server to process that event data has not been provided in advance of receiving the event data (e.g., notifying the event processing server of occurrence of an event), the event processing server will return an event rejection. In other words, if the event processing server is missing event information required for properly processing the event data (i.e., such missing event information that may be identified along with providing the event data to the event processing server), the event processing server immediately returns an event rejection notifying the event generation client which event information it should provide in order to complete event data processing. In this manner, if the event processing server detects an event which has never occurred before, for example, from an obscure product area, the event generation process (e.g of the event generation client) can report the event in an event data message along with an indication of event information required to process this event data. If the event processing server does not have this necessary event information, the event processing server can use the event rejection technique to indicate that the event generation process must supply the server with the missing event information so that the event data can be properly processed.

In one embodiment of the invention, events are managed as collections of related events that are treated as objects and tracked by the event generation client. The event processing server manages and tracks the hierarchy of the objects. The hierarchy of objects can be defined by templates. Accordingly, the event processing server, by processing objects according to information provided in the templates, can identify problems or other issues based upon the interrelationships between multiple objects.

One embodiment employs the use of extensible mark-up language (XML) format documents as the communications medium for information exchange between the components of the system. Accordingly, product developers are provided with XML templates that can be used to format the various components of information used (e.g., event registration information, event information, event data) which the event generation client and event processing server are configured to generate and process. Typically, sources of event data such as application software programs, embedded software and other software which control hardware are programmed to provide event data (e.g., including, for example, company, product, module, help, event ID, etc.) or generate events which an event generation process can detect and report to the event processing server using the format provided by the XML templates. In addition, customers can generate event information templates of their own in order to accommodate their unique event handling requirements.

Since the event processing server can process text-based XML data, transmitted for example, by means of the commonly available and widespread HTTP protocol (as described earlier), the embodiments of the invention provide a mechanism for accepting event information and event data to support systems operating on a variety of platforms. For example, it would be feasible to simultaneously accept and process event information and event data from event generation clients operating on various operating system platforms such as Microsoft® Windows®, Solaris®, Unix®, and so forth with one version of an event processing server. In addition, embodiments of the invention provide a mechanism for tunneling SNMP over HTTP and the ability to automatically forward the MIB to the event processing server.

In particular, an event processing server, in one embodiment of the invention, provides a method for processing events comprising the steps of receiving event registration information, identifying event information required to process event data, and based on the event information, determining if existing event information is accessible to process the event data. If the existing event information is not accessible the event processing server provides an event rejection indicating (i.e., to the event generation client) missing event information and then receives the missing event information identified in the event rejection. During this process, if the existing event information is accessible to the event processing server (i.e., no event rejection required or the missing event information provided in response to a former event rejection provides all of the required event information needed by the event processing server), then the event processing server provides an event data destination (e.g., a URL) to the event generation client and begins to receive the event data via the event data destination.

In another embodiment, the event registration information includes event registration information having unique identifiers identifying the source of the event data and event information required to process the event data. As an example of such an embodiment, the event registration information can contain unique identifiers that can identify such things as a product source, company source, software module or routine source or other source of event data as well as unique identifiers identifying event information such as the necessary XML templates or documents that will be required to process event data generated from the sources.

In another embodiment, event information (i.e., the event information used to process event data) is selected based on the event data received and the system generates an event output from the selected event information. As an example, event data may be received in the form of an XML-based message that indicates a simple event code and an associated text message to be used in conjunction with event information XML documents. The event processing server can use the event code to traverse the set of event information available to the event processing server in order to arrive in a location within the event information (referred to herein as the selected event information) that is related to the event code specified in the event data. Using the XML definitions defined at that location in event information, the event processing server can process the event code and the associated event text message to produce event output.

In still another embodiment, the event processing server accepts at least one of event registration information, event data and event information mark-up language documents. In other words, the event processing server can accept any of these types of documents and can process them according to the embodiments of the invention as explained herein.

In another embodiment, the event data includes network management data (e.g. SNMP data) indicating a network management event associated with a source of the event data, wherein the step of receiving event data utilizes hypertext transport protocol to receive the event data. Accordingly, this embodiment of the invention relates to processing events related to network management issues, SNMP tunneling and MIB forwarding.

In another embodiment, the event processing server reads first and second event data and processes the first and second event data to produce event output data that reflects a hierarchical event relationship between the first and second event data. This may be done, for example, using the interrelationships expressed in the various event information documents such as XML documents. As an example, the first event data may be event data identifying an event in a specific product or within a specific software routine within that product. The second event may identify another event within a different product area. However, since the event information used by the event processing server is preferably an arrangement of XML documents which can cross-reference and interrelate to one another, production of event output may require the appearance, occurrence or existence of both the first and second event data in order to trigger the event processing server to reference selected event information in order to produce an event output which reflects an error condition related to the first and second event data. It may be, for example, that the two products each experiencing independent events require each other's proper operation in order to function correctly. Accordingly, the first and second event data is may indicate to the event processing server, through the event information definitions, that when each product experiences its respective event data (i.e., the first and second events), the event output may indicate that the combined operation of each product is non-operational. In other words, the existence of the first and second event data from totally independent sources causes an escalated event to occur and to be reported in event output. To provide a more specific example, that is, the case of a router and switch, a router error, might, by itself, not be a fatal error. However, the same error, occurring in conjunction with a related switch error, on a separate system component, could indicate that a WAN/LAN connection has failed.

In yet another embodiment, the event processor creates system component status records and updates a status of the system component status record based on the event data received. In this manner, the event processing system of this embodiment of the invention is able to provide a status reporting mechanism for periodic status reporting concerning event sources.

Other embodiments of the invention relate to the event generation client. In one such embodiment, the event generation client participates in the event registration processing previously discussed by providing, to the event processing server, event registration information that identifies event information that the event processing server requires to process event data. In response to providing event registration information, the event generation client can receive an event rejection specifying missing event information that the event processing server does not currently possess. In response, the event generation client (e.g. or client process) can provide the missing event information to the event processing server so that the event processing server can properly process event data. Also in this embodiment, the event generation process or client detects an event, and in response to detecting the event, creates event data and sends the event data to the event processing server. The event processing server utilizes event information which the event processing server currently possesses to process event data to produce event output.

In another embodiment, the event generation client, in creating event data, formats the event data in a mark-up language format capable of transmission via a hyper-text transport protocol. As an example, the event data may be formatted in XML format.

In yet another embodiment, the event generating client initiates a multiple of status checks of sources to produce status check information and forwards status check information in the event data to the event processing server. In this manner, the event generation client can provide a heartbeat or other periodic status record to the event processing server regarding the status of event sources.

In still another embodiment, the event generating client periodically sends event data to the event processing server as confirmation of an operating communications channel.

In yet another embodiment, the event generation client receives an event rejection indicating missing event information from an event process server, then obtains the missing event information and sends the missing event information to the event processing server. In this manner, the registration process of the event generation client ensures that the event processing server has all of the required event information (i.e., XML documents) that are necessary to properly process event data.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
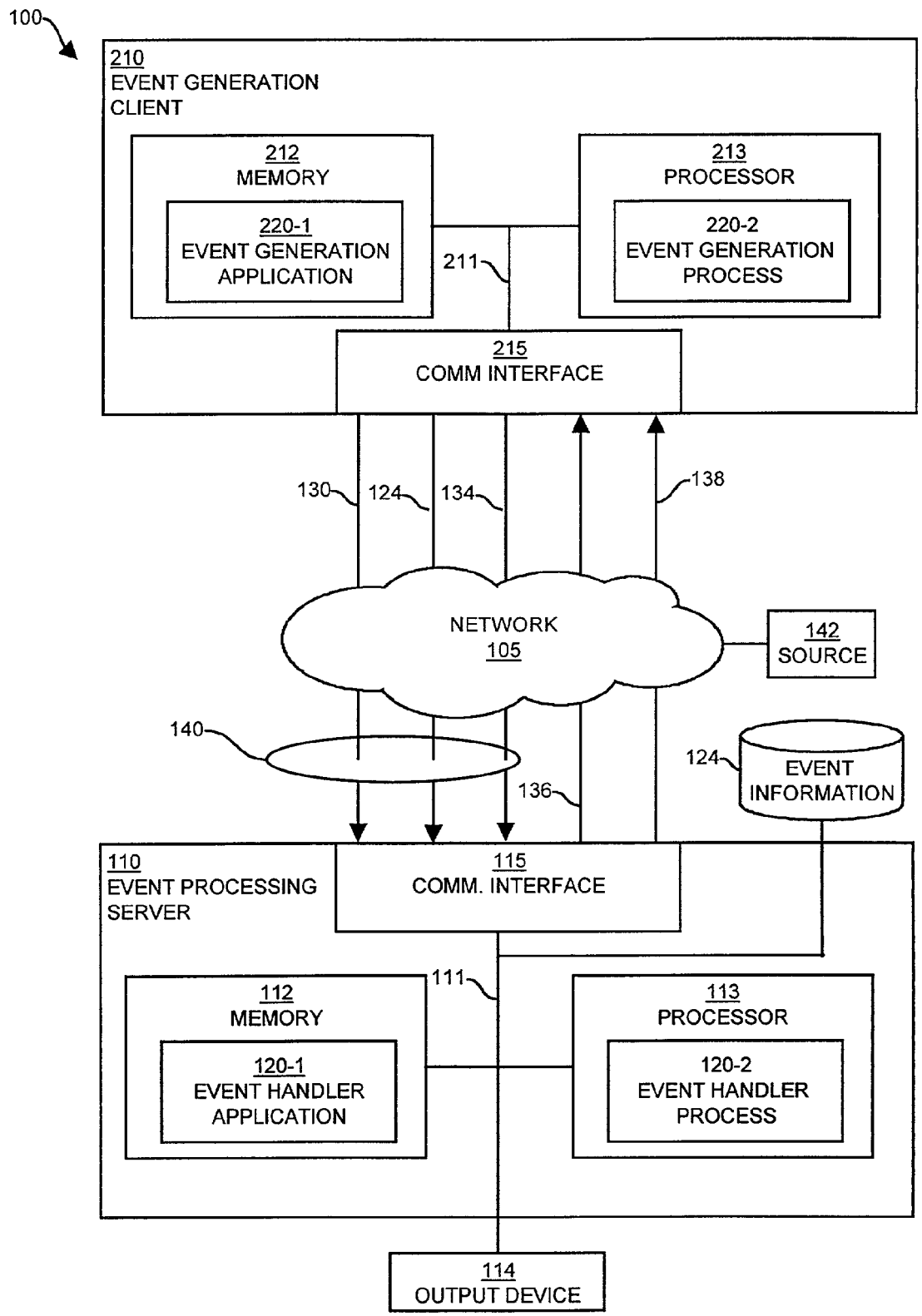
FIG. 1 shows an event handling system with components that are configured according to one embodiment of the invention.

The invention is directed to techniques and mechanisms for event monitoring, reporting and handling. In a hypothetical implementation of the invention, customers have hardware, software, and/or systems that are in need of monitoring. The hardware, software, and/or systems, referred to herein as event sources, communicate with an event generation client that can, in turn, communicate the occurrence of such events to an event processing server. The event processing server processes the event-related information, in an appropriate manner, in some cases providing analysis and/or, in some cases providing reports for technical support personnel to monitor and view at a remote location. In particular, related events are treated, that is, managed and tracked, etc. as objects. The condition of the related events may be observed and used to draw conclusions about the objects (e.g. observed events such as certain events being "down" may be used to draw conclusions about the particular objects, such as, that the state of a particular object is impaired or down). In turn, objects can also be related to one another, following a logic spelled out within event information (e.g. event information that was formatted according to templates).

For example, three different events 10, 52, and 25 are used collectively to identify an object called object x. The different events relate to completely separate devices. Object x is set up to apply logic to the events such that if both events 10 and 52 are down (e.g. inoperable) the object state is defined as impaired. On the other hand, if all three events (e.g. 10, 52, and 25) are down, then the object state is defined as down. Additional logic can be applied to objects, as well, whereby object states can be "rolled-up" into other objects. For example, two object, object x and object y are defined to roll-up in a hierarchical fashion into a third object, object z. Logic for the objects is defined such that if object x or object y is down (e.g. inoperable) then object z is defined as impaired, but if both objects x and y are down, then object z is defined as down.

Accordingly, in one embodiment, event information (e.g., information related to one or more of a company, product, module, help, event ID, message mapping, substitution mappings, hierarchical, chart templates, etc.) is maintained within a storage facility connected to an event processing server. The event information is expressed in one embodiment as a set of XML template documents that dictate or describe how event data is to be processed by the event processing server. Upon the initiation of the system, such as upon systems start up or upon detecting an initial event, the event generation client sends registration information to the event processing server to make it aware of event sources and event information that will be required to process event data (e.g. information about software and/or hardware occurrences) that will be sent from the event generation process to the event processing server. The registration information indicates to the event processing server to specific source of forthcoming event data as well as the complete set of event information that will be required to process event data once received. By complete set of event information, what is meant is that the event registration information in one embodiment specifies a set of one or more event information templates, such as XML documents, that the event processing server must possess in order to properly process the forthcoming event data. In this manner, embodiments of the invention allow an event generation client to preregister within the event processing server to give the event processing server a "heads up" as to what will be required to properly handle and process event data which the event generation client will begin to report to the event processing server.

When an event occurs within an event source (e.g., hardware or software program generating a hardware error message, system status message, software program failure report message, etc. all within the customer facility) the occurrence of the event is communicated to an event generation client, which, in turn, then generates event data which is communicated to the event processing server. Upon receipt of event data (e.g., notifying the event processing server of the occurrence of such an event), the event processing server uses stored event information (e.g., stored information about how to process the event data, such as the event information retrieved during the registration process) to determine how to interpret or handle the event data. If the event processing server has insufficient event information to process the event data received, it can send an event rejection to the event generation client notifying the event generation client as to which additional or missing event information is needed to process the event data. The client can respond by providing the missing event information. In response, the event processing server can provide the event generation client with an event data destination such as a URL indicating where the event generation client is to begin sending event data. In some embodiments, event rejections can be used even after registration is complete in order to indicate to the event generation client that the event processing server is lacking the necessary event information to properly process event data for a specific event.

One embodiment of the invention employs the use of extensible mark-up language (XML) format documents as the communications medium for information exchanged between the components of the system. Accordingly, product developers of the system are provided with XML templates or schema that can be used to format the various components of information used (e.g., event registration information, event information, event data). As described earlier, the templates also provide the event processing server with information about the hierarchical relationships between different objects. Typically, sources of event data such as application software programs, embedded software and software programs which control hardware will be programmed to provide event data (e.g., including, for example, company, product, module, help, event ID, etc.) to the event generation client using the format provided by the XML templates. In addition, customers can generate event information templates of their own in order to accommodate their unique event handling requirements. Such templates can inherit from base templates if so desired.

FIG. 1 shows an event handling system 100 which is suitable for use by the invention. The event handling system includes an event processing server 110, an event generation client 210, a network 105 and an event source 142. In addition, the event processing server 110 is connected to a storage device that stores event information 124, such as a disk drive or other storage facility.

The event processing server 110 is also connected to an output device 114, such as a simple display mechanism or a more complex system capable of evaluating, formatting, presenting, compiling, and/or organizing of event data 134, event information 124, etc. The event handling system 100 may be configured with multiple event generation clients 210, all capable of generating event messages 140.

The example system shown in FIG. 1 uses a series of event messages 140 transmitted over the network 105 between the event generation client 210 and the event processing server 110 including event registration information 130, event information 124 and event data 134. Also included are event rejections 136 and event data destinations 138.

An event source or sources 142 can include one or more software and/or hardware devices. It should be understood that there can be many event sources 142 (e.g., sources of events) coupled via a network 105 or other communications medium which operate according to embodiments of the invention. Some examples of event sources are software programs that are programmed with the ability to report events such as error messages, information about the software operation, etc., hardware or other devices capable of reporting error messages, problems, failures, etc.

Event sources 142 may communicate with event generation clients 210 over the network 105 or by other types of connection. In other cases, the event source 142 and the event generation client 210 may function integrally as single unit, such as, for example, a software program programmed to perform both the software program's normal operating functions and the functions of an event generation client 210. A hardware device may also have firmware, software or other programming which enables the device to perform the functions of an event generation client 210 in addition to performing its normal hardware functions. For example, a card, device or other hardware component of a computer system will usually be controlled by software or software-encoded firmware or electronics, etc. Another example is a router, which is encoded with software performing both the router's operational functions as well as the event generation client functions.

The event processing server 110 includes a communications interface 115, a memory 112 and a processor 113. It also includes an interconnection mechanism 111 (e.g., a data bus and/or circuitry) which couples the communications interface 115 (e.g., modem or other network interface), the memory 112 (e.g., any computer readable medium such as a random access memory (RAM) and/or read only memory (ROM) or even disk or storage medium), the processor 113 (microprocessor or central processing unit), the communications interface 115, the storage device for storing event information 124 and the output device 114. The memory 112 can store (i.e., is encoded with) an event handler application 120-1 software program. The processor 113 can operate an event handling process 120-2, which represents execution or other performance of logic instructions that form the event handler application 120-1 or other software. The communications interface 115 allows the event processing server 110 to communicate with the event generation client 210 and other components of the system via the network 105.

The event generation client 210 has a communications interface 215, a memory 212 and a processor 213. It also has an interconnection mechanism 211 (e.g., a data bus and/or circuitry) which couples the communications interface 215 (e.g., modem or other network interface), the memory 212 (e.g., any computer readable medium such as a random access memory (RAM) and/or read only memory (ROM) or even disk or storage medium) and the processor 213 (microprocessor or central processing unit) and communications interface 215. The memory 112 can store an event handling process 220-2, which represents execution or other performance of logic instructions that form the event generation application 220-1 or other software. The processor 213 can operate an event generation process 220-2 and/or other process which can either be the event generation application or other software. The communications interface 215 allows the event generation client 210 to communicate with the event processing server 210 and other components of the system such as the event source 142 via the network 105.

FIG. 1 shows one event generation client 210 for ease of description of the invention. It should be understood that there can be multiple event generation clients 210 coupled via the network 105 that each operate according to the embodiments of the invention.

The event processing server 110 and event generation client 210 may be any type of device or system such as digital or electronic devices, personal computers, workstations, servers, networked systems, or lager mini-computer or mainframe systems, or the like.

The components of the system 100 provide the methods and techniques for an event generation client 210 to generate and transmit event data 134 to a event processing server 110 for processing with the use of event information 124. Further details of the invention will now be provided with reference to FIG. 2.

Figure 2:
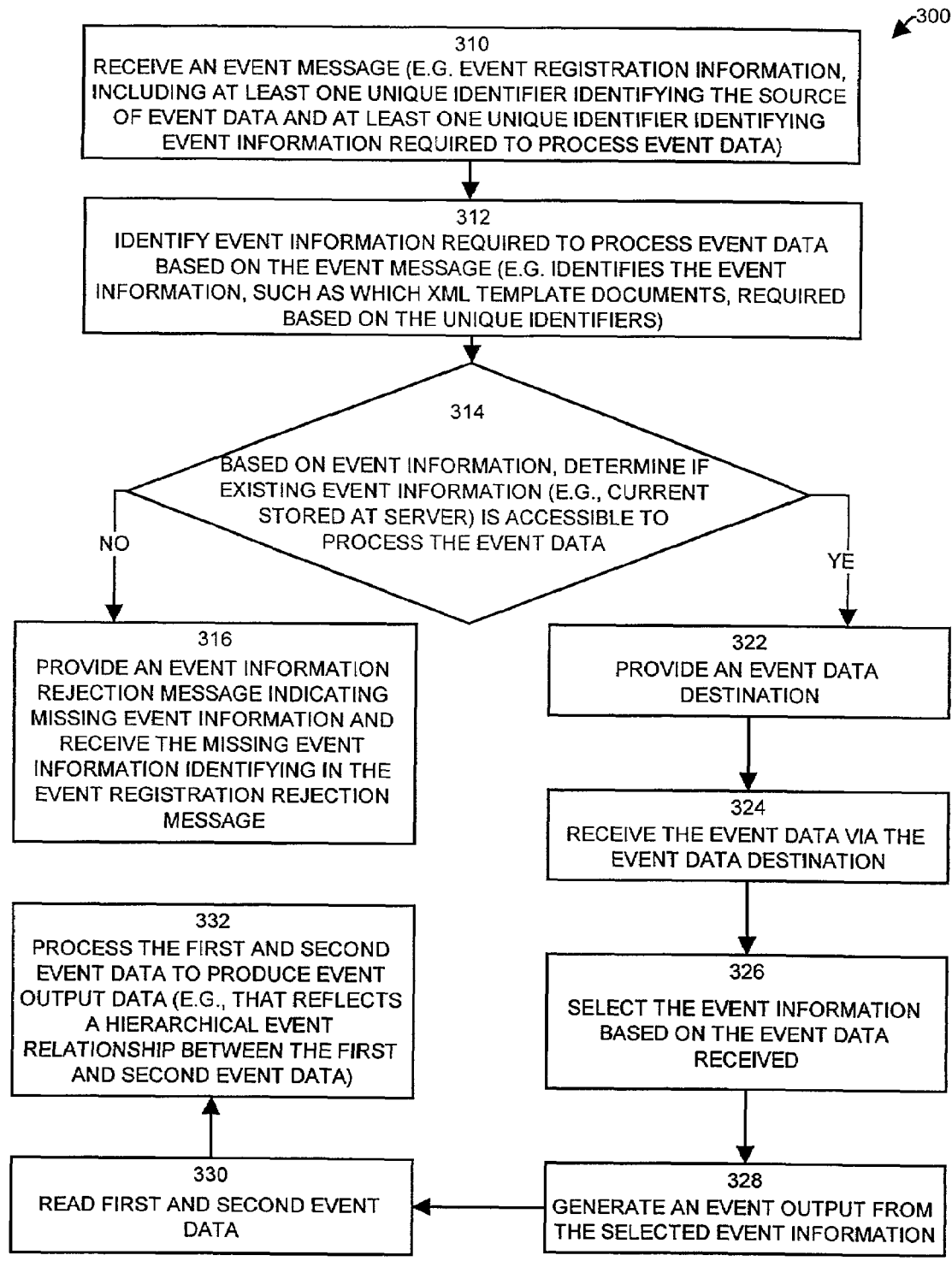
FIG. 2 is a flow chart of a procedure which is performed by the event processing server according to one embodiment of the invention.

FIG. 2 is a flow chart of a procedure performed by the event processing server according to one embodiment of the invention.

In step 310, the event processing server 110 receives an event message 140 (e.g., an error message from the event processing client 110 that detects a failed process or event registration information 130 from the event generation client 210, for example, including at least one unique identifier identifying the source of event data 134). In a preferred embodiment of the invention, the first event message 140 received by the event processing server 110 is an event registration information message 130. In another embodiment of the invention, however, the first event message 140 received by the event processing server 110 may be an event data message 140 which contains not only event data 134 but also an indication of event information 124 that will be required to process the event data 134. In such cases, the event message 140 contains both event data 134 and a specification of event information 124 (i.e., quite similar to event registration information 130) that the event processing server 110 will need to properly process the event data 134.

Accordingly, in this example embodiment, event messages 140 may be either event registration information 130, event information 124, or event data 134 or a combination thereof. Collections of related events can be defined as objects. The objects possess state characteristics and as previously describe, and can be rolled-up in a hierarchical manner. In this example, event messages 140 are provided in the form of XML (Extensible Mark-Up Language) documents. XML is a meta-markup language that can be used to define a syntax capable of identifying different parts of a document in a fashion that makes XML documents a good mechanism for exchanging data between different system components. The XML documents are used to exchange information between an event generation client 210 and the event processing server 110.

Event messages 140 are formatted according to a pre-established format defined by an event handling system developer. The event handling system (501, See FIG. 4) can distribute the document formats (e.g., format of documents containing event registration information 130, event information 124, or event data 134) to the product developers (504, See FIG. 4) (manufacturers of the event sources, such as, for example, hardware and software developers providing software and equipment, etc.) in the form of templates (504, See FIG. 4). In turn, product developers 502 (e.g., hardware and software vendors) design their equipment and systems to generate event registration information 130, event information 124, and/or event data 134 in compliance with the defined protocols and templates 504. Event messages 140 can contain globally unique identifiers (GUID's) (e.g., See 518, FIG. 4), that is, identifiers which use one of several well-known techniques for defining data elements that are assured to be globally unique (e.g. thereby allowing autonomy during the design phase). For example, using one of the techniques for developing a GUID (518, See FIG. 4), a designer can be assured that a company name acronym is not used to represent two different companies, or that the module of a particular software program does not use the same name for two different software modules. In this example, GUID's (518, See FIG. 4) may be used for company, product, module and template ID's that make up a part of event registration information 130, event information 124, and event data 134.

Event registration information 130 documents are documents that the event generation client 210 sends to the event processing server 110 in order to notify the event processing server 110, in advance, of event information 124 that the event processing server 110 will be required to have access to in order to process the event data 134 that it can expect to receive at some later point in time. Event information 124 documents are documents that provide required event information that the event processing server 110 needs in order to process any particular event data 134. The event data 134 represents documents that are sent to the event processing server 110 containing information about the occurrence of software and hardware reportable events.

In step 312, the event processing server 110 identifies event information 124 required to process event data 134 based on the event message 140. As discussed earlier, the event processing server 110 uses event information 124 to process event data 134. Accordingly, in step 312, the event processing server 110 can receive an event message 140 such as an event registration information message 130 and can ascertain from this message the set of required event information documents 124 that are necessary to process event data. In the alternative embodiment in which the event message 140 is an event data document 134, the event data document 134 may also specify or include a reference to (i.e., a globally unique identifier) event information 124 that the event processing server 110 will be required to access in order to properly process event data 134.

The event processing server 110 may receive event information 124 in advance of receiving event data 134 or the event processing server 110 may receive event information 124 after the event processing server 110 has notified an event generation client 210 to provide any missing event information, such as may be done in response to receiving an event registration information message 130.

In one implementation, a customer 502 can add or modify event information 124 in order to customize already existing event information 124. Event registration 130 by an event generation client 210 may be initiated in either of several different circumstances, either automatically, or based on user-issued control or a combination. For example, in one configuration, the event generation client 210 (connected to the software or hardware event source 142) is configured in such a way as to send an initial set of event information 124 to the event processing server 110, immediately upon being placed into service. Another option is for the event generation client 210 to send event registration information 130 to the event processing server 110 as a result of the occurrence of an event (e.g., immediately prior to sending event data 134) or as a result of the start of a sequence performed by the event generation process 220-2. An event generation client 210 may also be configured in such a manner as to send event registration information 130 at any time under its own control or as a result of user control (e.g. such as by a system administrator).

In step 312, the event processing server 110 identifies event information 124 required to process event data 134 based on the event message 140 (e.g. event registration information 130). The event processing server 110 is configured to identify the event information 124 that it will need in order to process later event data 134 which the event registration information 130 has notified the event processing server 110 to expect. In one embodiment, in step 312, the event processing server 110 obtains a list of GUID's from the event registration information 130 that indicate what XML event information 124 documents will be required to process forthcoming event data 134. Despite the existence of the event registration information 130, however, it is possible for event generation client 210 to send event data 134 without prior notification.

In step 314, based on event information 124 (i.e., identified in step 312), the event processing server 110 determines if existing event information 124 is accessible to process the event data 134. Accordingly, the event processing server 110 checks for available event information 124 (e.g., from a database, files stored on a disk drive, etc.), in order to determine if the event information 124 needed to process event data 134 is available.

Figure 4:
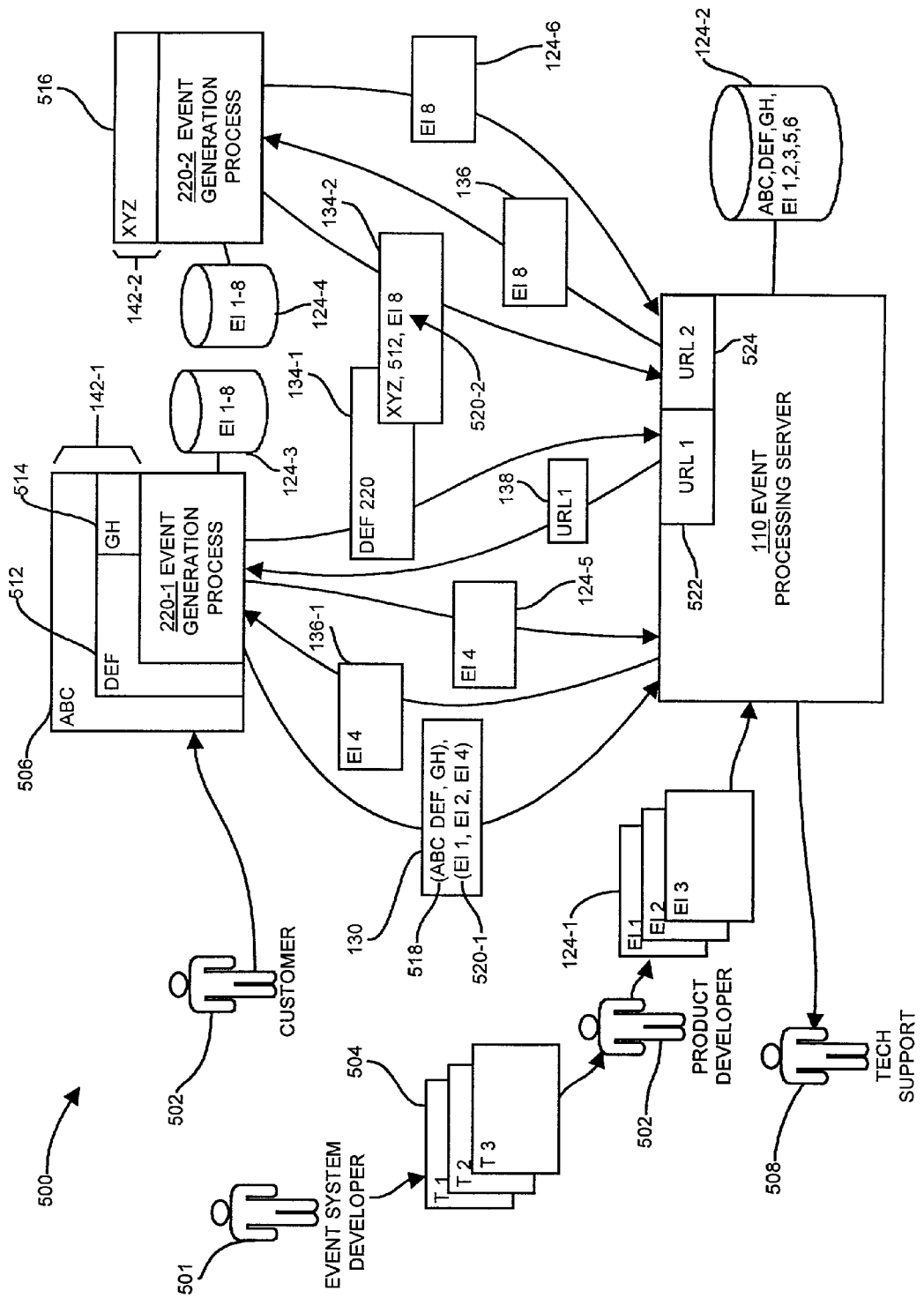
FIG. 4 shows an example of the event handling system in operation and which illustrates operation of example embodiments of the invention.

The event processing server 110 uses a variety of techniques and mechanisms to determine if needed event information 124 is accessible, including GUID's (globally unique identifiers) (518, See FIG. 4). In such a configuration, event information 124 documents may include one or more fields containing GUID's (518, See FIG. 4) that can be used to search existing event information 124. The event processing server 110 uses the GUID's (518, See FIG. 4) to identify if the event information 124 necessary for processing event data 134 is available to the event processing server. If the necessary event information 124 is accessible to the event processing server 110, processing continue to step 322. As an example, in one embodiment, the event registration information 130 may contain a list of GUID's that reference specific event information documents 124 (each identified by a unique GUID) that are required to process forthcoming event data 134. The event handling process 120-2 can then consult the database of existing event information 124 to determine if all of the required event information is available. If the event registration information 130 specifies an event information GUID that is not present within the event information database 124, then processing proceeds to step 316 explained below such that the event processing server 110 can notify the event generation client 210, via an event rejection 136, of any required or missing event information 124 that the event processing server 110 is lacking.

At this point, assume for this discussion that the event processing server 110 determines in step 314 at all of the required existing event information 124 is accessible in order to process forthcoming event data. As such, processing proceeds to step 322. In step 322, the event processing server 110 provides an event data destination 138 to the event generation client 210. In this example, event data destination 138 may be an address to which event data 134 can be transmitted (e.g., a URL address to which event data 134 can be sent). Different configurations are possible for the event data destination 138 (e.g., the event processing server 110 may provide different event data destinations 138 to accommodate different situations). The event processing server 110, may, for example, provide a different event data destination 138 for different types of events (e.g. different types of problems) or for different locations, etc. In another embodiment, the event processing server 110 may provide different event data destinations 138 at different times in order to balance work load between more than one event processing server 110.

In step 324, the event processing server 110 receives the event data 134 via the event data destination 138 (e.g., a communications channel specified by the event data destination address). The event data 134 (e.g., occurrences reported by the event generation client 210) is transmitted to the event processing server 110 via the event destination 138. In addition to the alternatives described earlier for event data destination 138, the event handling system may be configured with one continuous event destination address 138 rather than for the event processing server 110 to generate and transmit different event destination addresses 138.

In step 326, the event processing server 110 selects the event information 124 based on the event data 134 received. For example, if the event processing server 110 receives an error message (e.g., event data 134) concerning a disk drive at a particular corporate client location, the event processing server 110 may select event information 124 related to the company experiencing the error message, about the particular disk drive experiencing the error message, the disk drive model (e.g., module) and/or the particular error which occurred. In turn, the event processing server 110 uses data taken from event information 124 documents to process the event data 134. The event generation client 210 is able to identify the state of objects and transmit the information to the event processing server 110. In turn, the event generation server 110 can process the object information based upon the hierarchical relationships between different objects.

In step 328, the event processing server 110 generates event output from the output device 114 using selected event information 134. As described earlier, the event output may simply display the event data or provide a more complex compilation of the event data 134 and may include other information.

In FIG. 2, processing steps 320 and 332 are optional and will be explained here for completeness.

In step 330, the event processing server 110 reads first and second event data 134. In some cases, event data 134 from different occurrences of events may have related causes. Accordingly, it is sometimes possible for the event processing server 110 to better identify the source of a problem by comparing two or more event data 134 occurrences. For example, the failure of a disk drive write procedure may result in a "file write" error message. There are numerous possible causes of such an error. For example, in some cases, if an existing file is corrupted, attempts to write a new file over the existing file may fail. In another situation, if a disk drive runs out of available free space, the attempt to write a new file may fail.

However, the existence of an independent CRC (cyclic redundancy check) error message would rule out to the likelihood that either file corruption or lack of free space was the cause of a disk file write failure. Therefore, comparisons between different event data 134 items are able to provide additional information to help in diagnosis. Accordingly, as discussed earlier, the event processing server reads two or more portions of event data 134 for comparison from the same or different sources 142 applying logic to objects as defined in event information 124.

In step 332, the event processing server 110 processes the first and second event data 134 to produce event output data 114 that reflects a hierarchical relationship between objects of the first and second event data 134. Accordingly the event processing server 110 compares the objects of the event data 134 occurrences in order to identify relationships between event-defined objects that can be reported.

Step 316 concerns situations in which there is inadequate event information 124 to process event data 134 that has or that will be received. In step 316, the event processing server 110 provides an event rejection 136 indicating missing event information 124. As described earlier, the event processing server 110, as a result of receiving event registration information 130, may find that it lacks adequate event information 124 necessary for processing event data 134 that the event registration 130 indicates the event processing server 110 could receive. In an analogous situation, event processing server 110 may receive event data 134 (instead of event registration information 130 as in the earlier-described situation) for which it lacks adequate event information 124 needed for processing. In either case (receiving either event registration information 130 or event data 134) the event processing server 110 will generate an event rejection 136 in order to notify the event generation client 210 about the existence of missing event information 124.

After the event generation client 210 acquires the missing event information 124, and transmits the missing event information 124 back to the event processing server 110, the event processing server 110 receives the missing event information identified in the event rejection 136 from the event generation client 210. Further details of the invention will now be provided with reference to FIG. 3.

Figure 3:
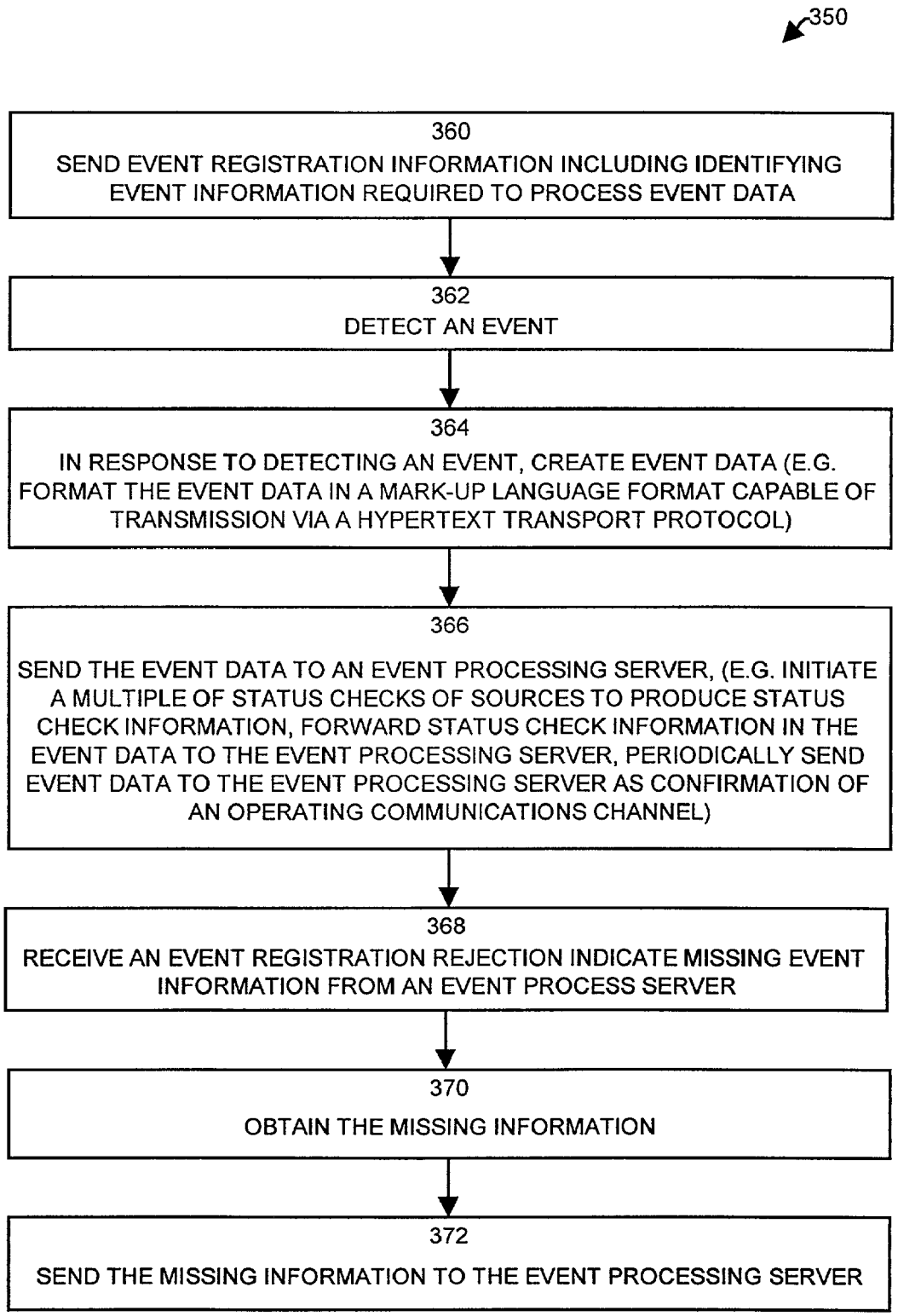
FIG. 3 is a flow chart of a procedure which is performed by the event generation client according to one embodiment of the invention.

FIG. 3 is a flow chart of a procedure 350 performed by the event generation client 210 according to one embodiment of the invention.

In step 360, the event generation client 210 sends event registration information 130 including identifying event information 130 required to process event data 134.

Users of the event handling system may reduce the number of the event rejections 136 generated by the event processing server 110 by submitting event registration information 130 to the event processing server 110 prior to submission of event data 134.

In one example, the event generation client 210 transmits event registration information 130 to the event processing server 110. The event registration information 130 may identify the company, product, module or other information indicating where forthcoming event data 134 will be generated from (e.g., identifies the source 142 of event data). In addition, the event registration 130 can specify all event information documents 134 (e.g., XML documents) that will be required by the event processing server 110 to process the forthcoming event data 134. In the example, the event generation client 210 provides a registration information 130 document identifying or indicating a product, such as, for example, a network digital environmental control device, and a list of events (e.g., error messages) which the event generation client 210 is aware may be sent to the event processing server 110, if such an event were to occur. The company, ACME and the product, Super-Control listed may be represented by a globally unique identifier (GUID) (See 518, FIG. 4).

Upon receipt of the event registration information 130, the event processing server 110 using the GUID's (See 518, FIG. 4) provided, (e.g., Acme/Super-Control) will search the event information 134 which the event processing server 110 has available in its information store 124. If the event information 124 required for processing the event data 134 received is not accessible to the event processing server 110, the event processing server 110 will send an event rejection 136 to the event generation client 210 informing the event generation client 210 of the event information 124 (e.g., the event information 124 identified by the ACME, or Super-Control GUID's) that the event processing server 110 finds missing in order to process the event data 134 received.

In step 362, an event generation client 210 detects an event 142.

In step 364, the event generation client 210, in response to detecting an event, creates event data 134 (e.g. formats the event data in a mark-up language format document capable of transmission via a hypertext transport protocol).

Because, as in this example, the event handling system uses XML documents as its medium of information exchange (e.g., event messages, etc.) any device or system having access to the Internet for communication of information using the HTTP (hypertext transfer protocol) can transmit event messages 140 over the Internet. For example, numerous personal computers having Internet access at individuals' homes, individual computers having Internet access over a corporate network, etc. which are all capable of transmitting event messages 140 formatted using XML would therefore be capable of transmitting the event data documents 134 to a remote event processing server 110 for processing.

In step 366, the event generation client 210 sends the event data 134 to an event processing server 110.

In addition to sending event data 134, as a result of detecting an actual event, the event generation client 210 also tracks objects (e.g. as a result of the occurrence of a collection of related events). The event generation client 210 sends event data 134, identifying objects, to an event processing server 110. In turn, the event processing server 110, after receiving the event data 134, in the form of objects, from the event generation client 210, uses event information 124 (e.g. identified in the form of objects) in conjunction with event data 134, as originally defined by templates, to identify the hierarchy of the identified objects). Using the information collected and processed, in this way, the event processing server 110 can manage and track the hierarchy of objects who's state was identified by the event generation client 210. Accordingly, in one embodiment of the invention, the event generation client 210 initiates a series of status checks of event sources 140 to produce status check information (e.g., event data 134). The event generation client 210 forwards the status check information, as event data 134, (e.g. in the form of objects) to the event processing server 110 for processing using hierarchical relationships defined in the event information 124. For example, mission critical systems may be configured in such a fashion that the event generation client 210 coupled to the mission critical systems initiates a status check of critical objects of the mission critical system, for example, every 10 minutes. As a result of the ten minute status checks, the event generation client 210 forwards event data 134 (e.g. in the form of objects) to the event processing server 110 after each status check, thereby reporting the operational status of designated aspects of the objects of the mission critical system (e.g., event source 142) operation. Upon receipt of the event data 134, the event processing server 110 uses templates (e.g. which describe the hierarchy of the objects) to process the event data.

In another embodiment of the invention, the event generation client periodically sends event data 134 to the event processing server 110 as confirmation of an operating communications channel. The purpose of this function is to provide a heartbeat or self-maintenance check of the event handling system 100 communications facilities (e.g., the network 105). Accordingly, the event processing server 110 is configured to report any missing periodic transmission of event data 134 from the event generation client 210. By reporting such an occurrence, the event processing server 110 provides notification that the communications channel between the event generation client 210 and the event processing server 110 may be compromised.

In step 368, the event generation client 210 receives the event rejection 136 indicating missing event information 124 from an event processing server 110. As described earlier, the event processing server 110, which has been configured to check its information store 124 for event information 124 sends an event rejection 136 to the event generation client 210 informing the event generation client 210 of event information 124 that the event processing server 110 finds missing either as a result of any event registration 130 process or by receipt of actual event data 134 itself.

For example, if a customer (See 502, FIG. 4) installs a new module of an application program on a personal computer operating on a corporate network without providing event information to the event processing server 110 about the existence of the new module, when the event generation client 210 attempts to register the set of event data that it expects to send to the event processor server 110 with respect to the new module, the event processing server 110 will return an event rejection 136 to the event generation client 210 notifying the event generation client 210 that it has no documents available providing event information 124 needed to process the event data 134 for that particular module.

In step 370, the event generation client 210 obtains the missing event information 124.

In step 372, the event generation client 210 sends the missing event information 124 to the event processing server 110. Further details of the invention will now be presented with reference to FIG. 4.

FIG. 4 is a diagram depicting the flow of information in an example operation of the invention.

In general, the invention is directed to techniques and mechanisms for event processing. Event information 124-2 is maintained within a storage facility connected to an event processing server 110 and is used to process event data 134. Event data 134 is generated when an event source 142 (e.g., hardware or software program generating a hardware error message, system status message, software program failure report message, etc.) communicates with the event processing server 110 via an event generation process 220 to report the event. Upon receipt of event data 134 notifying the event processing server 110 of the occurrence of such an event, the event processing server 110 uses stored event information 124-2 to determine how to interpret or handle the event data 134.

Although the initial installation of the system may include an initial installation of event information 130, additional event information 520 may be added to the storage facility 124-2 of event information as it is "discovered". If event information 124 required by the event processing server 110 to process event data 134 has not been provided in advance of receiving the event data 134 (e.g., notifying the event processing server 110 of the occurrence of an event), the event processing server 110 will return an event rejection 136.

An event generation client 210 may also be configured to provide event registration information 130 to the event processing server 110 that serves to notify the event processing server 110, in advance, of event data 134 that it might receive. If the event processing server 110 is missing event information 124 for the event data 134 identified in the event registration information 130 process, the event processing server 110 immediately returns a event rejection 136 of the event registration, notifying the event generation client 110 of the event information 124 that it should provide in order to be able complete event data 134 processing.

One embodiment employs the use of extensible mark-up language (XML) format documents as the communications medium for information exchange between the components of the system. Sources of event data such as application software programs embedded software, and software programs which control hardware may be programmed to provide event data (e.g., including, for example, company, product, module, help, event ID, etc.) using the format provided by the XML templates. In addition, users or customers can generate event information templates of their own in order to accommodate their unique event handling requirements.

Since the event processing server can process text-based XML data, transmitted by means of the commonly available and widespread HTTP protocol, the embodiments of the invention provide a mechanism for event generation clients 210 sending event messages 140, etc. and for event processing servers 110 accepting event information 124 and event data 134, etc. operating on a variety of platforms.

FIG. 4 includes an event processing server 110, two different event generation processes 220-1, 220-2 and representations of an event handling system developer 501, a product developer 502, a customer 502, and technical support personnel 508. As will be explained later, in more detail, the event processing server 110 and the event generation processes 220-1 and 220-2 can access event information 124, 505-3, respectively.

The event processing server 110 shows two event report destination URL's 522, 524. Attached to the event generation processes 220-1, 220-2 are a series of source identifiers 506, 512, 514, 516 used to identify event sources 140-1, 140-2.

The flow of event messages 140, event rejections 136 and report destination address 138 documents depict two different scenarios of operation: i) one scenario that involves the use of event information registration 130 in which the event processing server 110 determines missing event information 124 necessary to process expected future event data 134 during the registration process, and ii) transmission of event data 134-1 in which missing event information 124-5 is accessible to the event processing server 110 without prior registration. Further details of the invention will now be provided with respect to FIG. 5.

Figure 5:
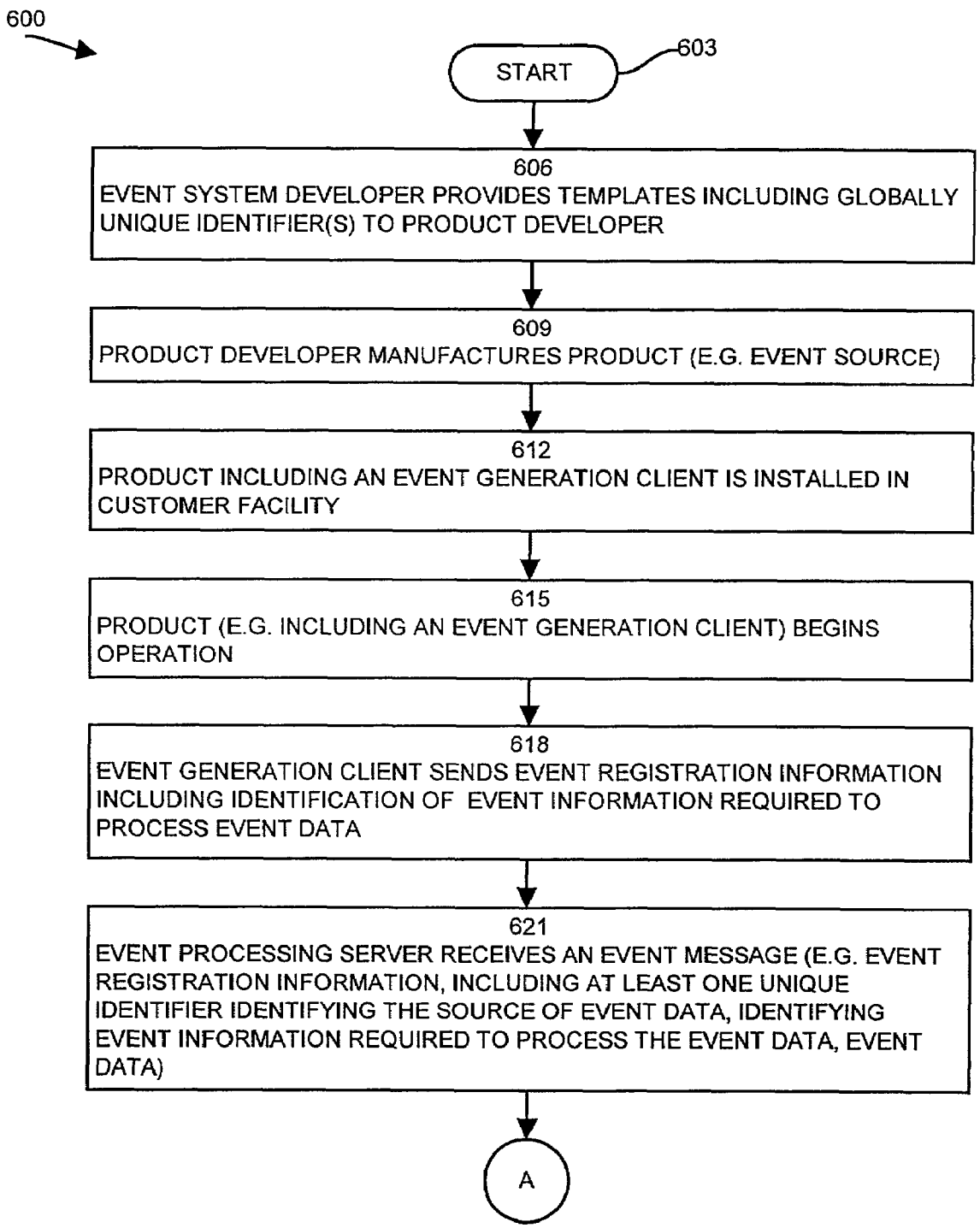
FIGS. 5-7 are a flow chart of a procedure performed in an example of the event handling system configured according to one embodiment of the invention.
Figure 6:
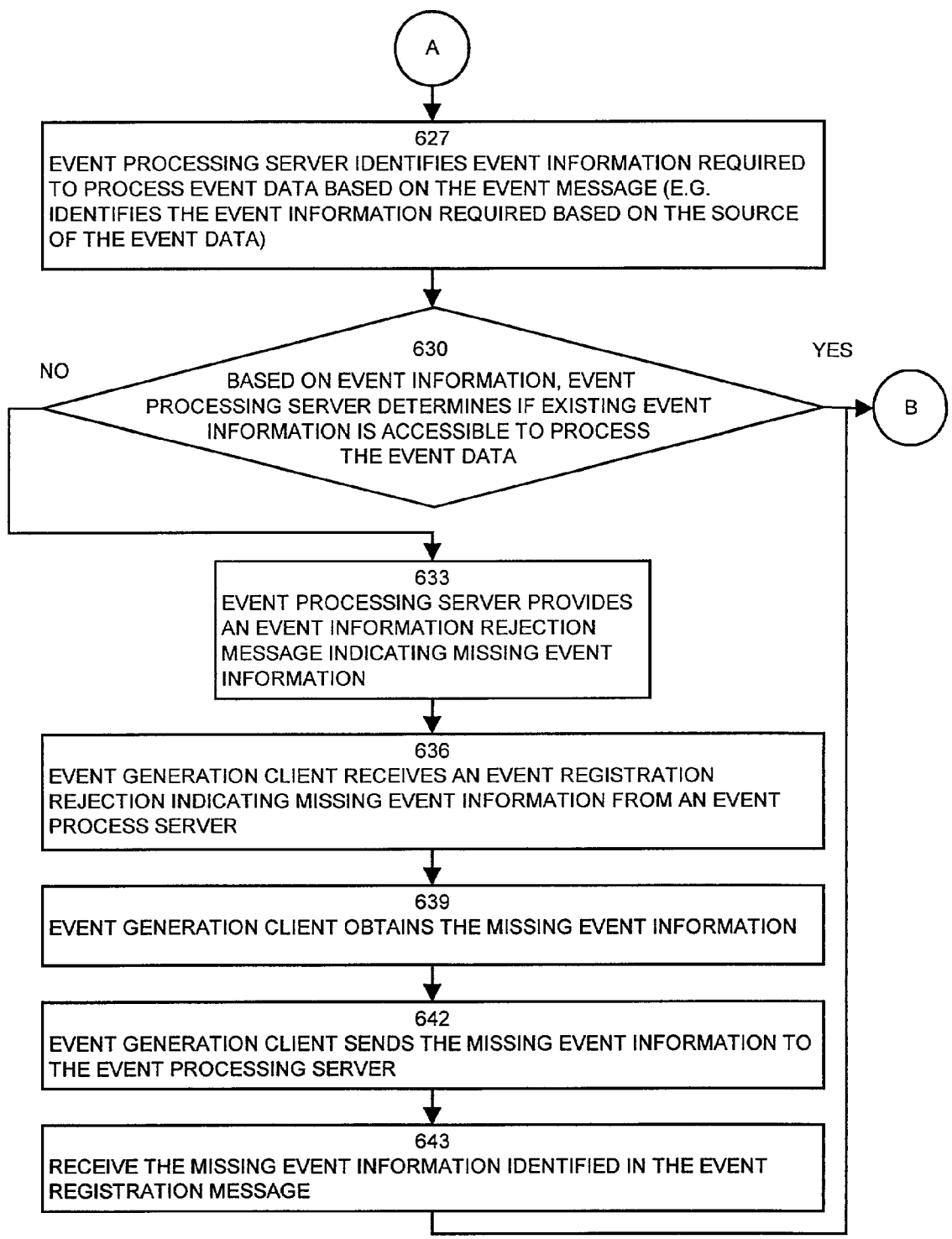
Figure 7:
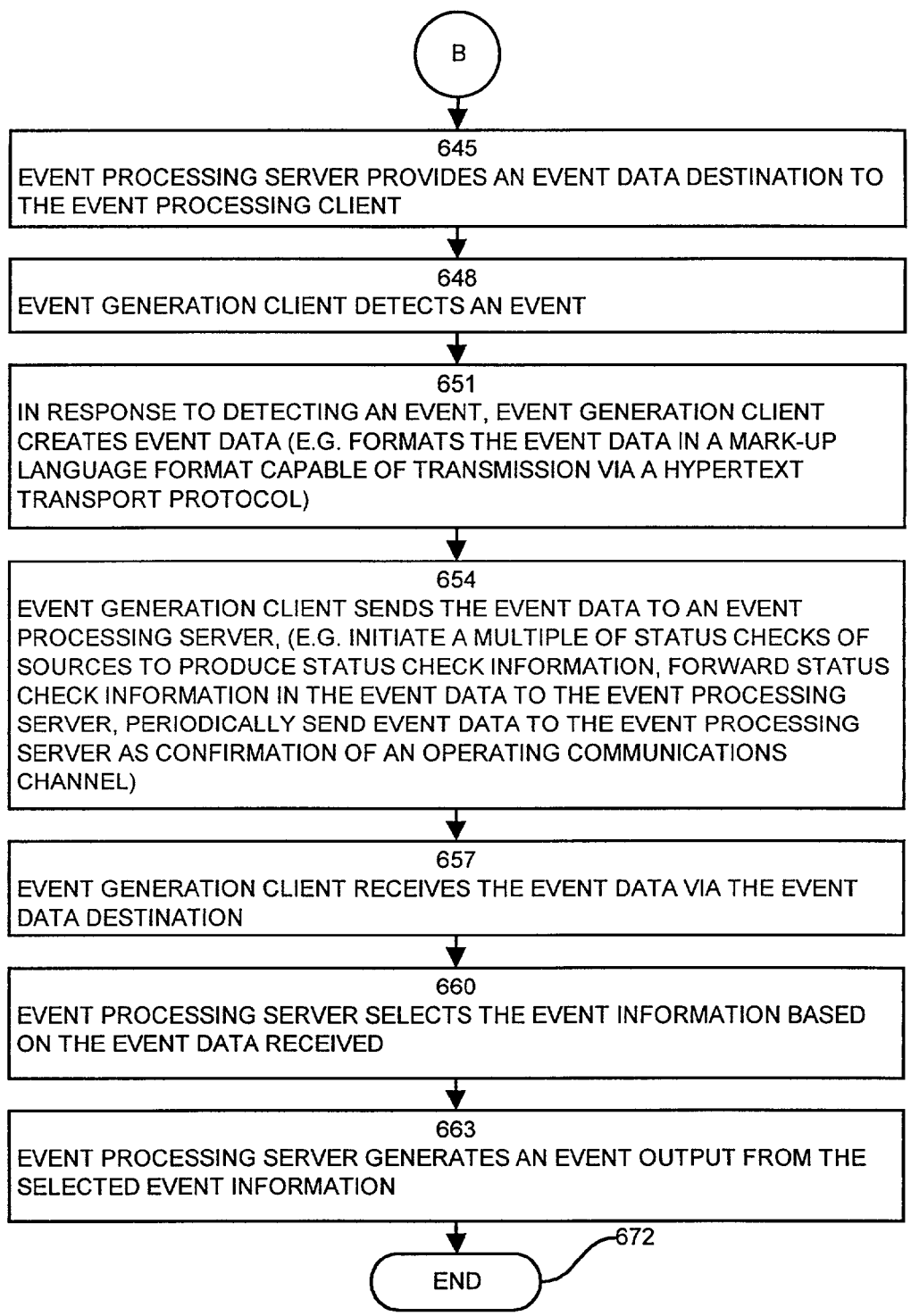

FIGS. 5-7 are a flow chart of a procedure performed according to the diagram of FIG. 4.

FIG. 5 is a flow chart of an example 600 of the invention as depicted in FIG. 4.

In step 606, event system developers 501 provide templates 504 which include globally unique identifiers (GUID's T1 and T3) for use by product developers 503 when creating products such as event sources 142-1, 142-2. The templates 504 are sample documents demonstrating the proper format (e.g., the proper XML formatting) for event messages 140, etc.

In step 609 the product developer 503 manufacturers products (e.g., events sources 142-1, 142-2) containing event information 124. The templates 504 show the format for event message 140 documents (e.g., event registration 130 documents, event information 124 documents, event data 134-1, 134-2 documents) and other documents that are processed by the event processing server 110.

For example, suppose an interface card manufacturer (e.g., a product developer 503) wants its product to have the ability to output error messages that can be processed by the event processing system 500 according to one embodiment of the invention. In order to incorporate that capability into the product developer's 503 product (e.g., the interface card), it is necessary for the interface card to produce an event detectable by the event generation process which in turn, produces an output which can be transferred to and processed by the event processing server 110. In order to create that capability, the interface card manufacturer (e.g., product developer 503) modifies software drivers which operate the actual interface card hardware (e.g., 142-1, 142-2, etc.) to include functions performed by the event generation client 210, and in particular, includes the ability to create event message 140 documents in the proper format.

In step 612, a customer purchases and installs a product (142-1, 142-2) including an event generation client (210, See FIG. 1, which is capable of operating an event generation process, more specifically 220-1, 220-2, in this example) in the customer facility that operates the event source 142. For example, a customer 502 purchasing an interface card such as the one described above, installs the interface card (e.g., event source 142-1, 142-2, etc.) within his own computer system. As described above, the software drivers provided with the interface card that operate the interface card serve as an event generation client 210.

In step 615, the product (e.g., event source 142-1, 142-2, etc.) begins operation.

In step 618, the event generation client 210 (e.g., operating event generation process 220-1) sends event registration information 130 including identification (e.g., GUID's) of event information 124 required to process event data 134. The event registration 130 informs the event processing server 110 about event data 134-1 that it can expect to receive in the future. Included in the event registration 130, in one section 518, are GUID's (e.g., ABC, DEF, GH representing a company, product, and module, respectively). The event registration 130 may also include identification of event information 520 (e.g., EI 1, EI 2, EI 4) as described earlier. The event registration information 130 serves to notify the event processing server 110, in advance, of event data 134 that the event generation client 210 is configured to send to the event processing server 110. By virtue of receiving the event registration information 130, the event processing server 110 is able to check the event processing server's 110 existing event information 124-2, in order to determine if all of the existing event information 124-2 is available for processing forth coming event data 134 that will be received. Event registration 130 thereby reduces the likelihood that processing of any event data 134 will be delayed, as a result of not having the proper existing event information 124.

The event generation client 210 may send event registration information 130 to the event processing server 110 at any time. For example, after a customer 502 installs and powers-up new hardware or software (e.g., event sources 140-1, 140-2, etc.) the event generation client 210-1, 210-2 can immediately send event registration information 130 to the event processing server 110 notifying the event processing server 110 of all the additional event data 134 that it can expect to receive. The event generation client 210 (that is capable of operating an event generation process 220-1) can send event registration information 130 to the event processing server 110 at other times as well. For example, if the customer 502 updates the device drivers of the interface card, the new device drivers may have the ability to report the occurrence of additional errors that the prior device drivers were not capable of reporting. Upon installation of the new device drivers, the event generation process 210-1, may, at that time, send additional event registration 130 notifying the event processing server 110 of the additional error messages (e.g., event data 134) that the event processing server 110 can expect to receive in the future.

In step 621, the event processing server 110 receives an event message 140 such as the event registration information 130. The event registration information 130 sent from the event generation client 220-1 includes at least one unique identifier (e.g., a GUID) identifying the source 142-1, 142-2 of the event data 134-1, 134-2 and providing an identification of event information required to process forth coming event data.

FIG. 6 is a continuation of the procedure described in FIG. 5.

In step 627, the event processing server 110 identifies event information 124 required to process event data 134 based on the event message 140 (e.g., the event processing server 110 identifies the event information 124 required, based on the source 142-1, 142-2 of the event data 134 as indicated in the event registration information 130).

As an example, using event registration information 130, the event processing server 110 may identify the event information 520-1 required to process forth coming event data 134-1.

In step 630, based on event information determined to be required in step 627, the event processing server 110 determines if the existing event information 124-2 (e.g., stored in an information store) is accessible to, or is present in the event processing server 110. For example, in the event registration information 130 sent to the event processing server 110, the event processing server 110 checks to determine if the identified event information 520-1 is accessible by the event processing server 110 (e.g., stored in the existing event information 124-2) that would be needed to process event data for event source 142-1, that is, company ABC, product DEF, module GH.

In step 633, if the existing event information 124-2 is found to not be accessible to the event processing server 110, the event processing server 110 provides an event rejection 136 indicating which missing event information is required. The event rejection 136-1 specifies what additional or missing event information (e.g., EI 4) will be required for processing future event data 134. In other words, the event processing server 110 returns an event rejection 136-1 to the event generation process 220-1 notifying the event generation process 220-1 of the missing event information.

In step 636, the event generation client 210 receives the event rejection 136-1 indicating missing event information 124-5 from an event processing server.

In step 639, the event generation process 220-1 obtains the missing event information from its set of event information 124-3.

In step 642, the event generation client 210 (e.g., operating event generation processes 220-1, 220-2) sends missing event information 124-5 to the event processing server 110.

In step 643 the event processing server 110 receives missing event information 124-5 identified in the event registration message 130, which was sent by the event generation client 210, as described earlier.

FIG. 7 is a continuation of the procedure performed in FIGS. 5 and 6.

In step 645, the event processing server 110 provides an event data destination 138 to the event generation process 220-1. The event data destination 138 is used by the event generation client 210-1 as the destination address 522 (e.g., URL 1) that the event processing server 110 uses to receive event data 134. In an alternative embodiment of the invention, a data destination address 524 (e.g., URL 2) is established as a permanent data destination address 524 for reception of all event data 134-2. In the case of such an embodiment, having a fixed destination address, it may not be necessary for the event processing server 110 to send an event data destination (e.g., such as event data destination 138).

In step 648, an event generation process detects an event (e.g., which occurs with respect to a source 142-1).

In step 651, in response to detecting an event, the event generation process 220-1 creates event data 134 (e.g., formats the event data in a markup language format capable of transmission via a hypertext transmission transport protocol).

In step 654, the event generation process 220-1 sends the event data 134-1 to the event processing server 110. The event generation process 220-1 may periodically initiate one or more status checks of sources (e.g., events sources 142-1, 142-2, etc.) in order to produce status check information and forward status check information in the event data 134-1 to the event processing server 110 as confirmation of an operating communications channel.

In step 657, the event processing server 110 receives the event data 134-1 via the event data destination 138 (e.g., via a URL address 522 specified by the event data destination 138).

In step 660, the event processing server 110 selects the event information 124-2 based on the event data 134-1. In this example the event information 124-2 required to process the event data 134-1 is already accessible to the event processing server 110 due to the fact that such event information 124 could have been provided as a result of event information 124 that was initially stored or which was transmitted to the event processing server 110 along with event registration information 130 or the event information 124 could have been provided to the event processing server 1110 at any time, as described earlier.

In another example, event information 124 may be provided to the event processing server 110 as a result of an event rejection 136 that occurred after event registration 130 or that occurred due to a prior rejection of event data 134 (see FIG. 1).

In step 663, the event processing server 110 generates an event output via the output device 114 from the selected event information 124. As described earlier, the event output may take a variety of forms including output to a computer display, output which is further analyzed and processed, etc., as determined by stored event information 124. In one embodiment, the event processing server 110 reads or accesses first and second event data 134-1, 134-2 and the event processing server 110 then processes the first and second event data 134-1, 134-2, etc. to produce event output data (e.g., displayed via the output device 114) that reflects a hierarchical event relationship between the first and second event data 134-1, 134-2, etc. As described earlier, the event processing server 110 can compare event data 134-1, 134-2, etc. which resulted from different occurrences of events in order to identify relationships between different events that could be used to provided additional information for diagnostic purposes.

The features of the invention may be employed in data communications device and other computerized devices such as those manufactured by Cisco systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, a data communications network, such as the network 105, described earlier, may include hosts interconnected by various communications devices such as routers, bridges, switches, access servers, gateways, hubs, concentrators, proxy servers, repeaters and so forth which exchange data over an interconnection of data links. Connections may include physical or wireless connections, such devices as modems, transceivers, network interface cards, fiber optic cards, ports, facilities such as T1, fractional-T1, or simple wire connections, etc. that allow the propagation of data between the various devices and hosts.

What is claimed is:

1. In an event processing server, a method for processing events comprising the steps of:
    receiving an event message, the event message containing event registration information including product versions currently supported and a definition of a set of classes for said product, wherein said definition of a set of classes includes, for each class, a name, a unique identifier, a description of the class, and definitions of dynamic variables for each class, said dynamic variables including properties and alarm attributes;
    identifying event information required to process event data based on the event message;
    based on the event information, determining if existing event information is accessible to process the event data and if the existing event information is not accessible:
        i) providing an event rejection indicating missing event information; and
        ii) receiving the missing event information identified in the event rejection.

2. The method of claim 1 further comprising the steps of:
    selecting the event information based on the event data received; and
    generating an event output from the selected event information.

3. The method of claim 1 wherein the event message includes at least one unique identifier identifying the source of the event data.

4. The method of claim 3 wherein the step of identifying event information required to process event data identifies the event information required based on the source of the event data.

5. The method of claim 1 wherein the event message includes at least one unique identifier identifying event information required to process the event data.

6. The method of claim 1 wherein the steps of receiving comprise a step of accepting at least one of event registration information, event data and event information mark-up language documents.

7. The method of claim 1 wherein the event data includes network management data indicating a network management event associated with a source of the event data and wherein the step of receiving event data utilizes a hypertext transport protocol to receive the event data.

8. The method of claim 1 wherein in the step of determining, if the existing event information is accessible, the method further comprises the steps of:
    i) providing an event data destination; and
    ii) receiving the event data via the event data destination.

9. The method of claim 8 wherein the steps of receiving comprise the steps of:
    reading first and second event data;
    processing the first and second event data to produce event output data that reflects a hierarchical event relationship between the first and second event data.

10. The method of claim 1 further comprising the step of creating system component status records and wherein the step of receiving the event data further includes the step of:
    updating a status of the system component status record based on the event data received.

11. The method of claim 1 wherein the event message contains event data.

12. The method of claim 11 wherein the event message contains event registration information.

13. The method of claim 1 wherein said event registration information includes information that identifies a source of forthcoming event data as well as event information that the event processing server will require in order to be able to correctly process the forthcoming event data.

14. The method of claim 1 further comprising maintaining a time history of a series of events related to an alarm attribute.

15. The method of claim 14 further comprising tracking how often the attribute is down and how often the attribute is up based on said time history of a series of events related to an alarm attribute.

16. The method of claim 1 wherein the event information is separate from the event data, the event data defining how the event data is processed.

17. The method of claim 16 wherein the event information includes XML templates.

18. In an event generation client, a method for processing events comprising:
    sending event registration information including identifying event information required to process event data, said event registration information further including product versions currently supported and a definition of a set of classes for said product, wherein said definition of a set of classes includes, for each class, a name, a unique identifier, a description of the class, and definitions of dynamic variables for each class, said dynamic variables including properties and alarm attributes;
    detecting an event;
    in response to detecting an event, creating event data; and
    sending the event data to an event processing server;
    receiving an event rejection indicating missing event information from an event process server.

19. The method of claim 18 wherein the step of creating event data includes formatting the event data in a mark-up language format capable of transmission via a hyper-text transport protocol.

20. The method of claim 18 wherein the step of sending event registration information further comprises the step of:

initiating a multiple of status checks of sources to produce status check information; and forwarding status check information in the event data to the event processing server.

21. The method of claim 18 wherein the step of sending the event data further comprises the step of:

periodically sending event data to the event processing server as confirmation of an operating communications channel.

22. An event processing server for processing event messages comprising:

a memory;

a communications interface;

a processor; and an interconnection mechanism coupling the memory, the processor and the communications interface;

wherein the processor is configured to:

receive an event message, the event message containing event registration information including product versions currently supported and a definition of a set of classes for said product, wherein said definition of a set of classes includes, for each class, a name, a unique identifier, a description of the class, and definitions of dynamic variables for each class, said dynamic variables including properties and alarm attributes;

identify event information required to process event data based on the event message;

based on the event information, determine if existing event information is accessible to process the event data and if the existing event information is not accessible:

i) provide an event rejection indicating missing event information; and ii) receive the missing event information identified in the event rejection.

23. The event processing server of claim 22 wherein the event processing server is further configured to:

select the event information based on the event data received; and generate an event output from the selected event information.

24. The event processing server of claim 22 wherein the event processor is further configured such that the event message includes at least one unique identifier identifying the source of the event data.

25. The event processing server of claim 24 wherein the event processor, in identifying event information, is further configured to identify event information required to process event data identifies the event information required based on the source of the event data.

26. The event processing server of claim 22 wherein the event processor is further configured such that the event message includes at least one unique identifier identifying event information required to process the event data.

27. The event processing server of claim 22 such that in the step of receiving the event processing if further configured to:

accept at least one of event registration information, event data and event information mark-up language documents.

28. The event processing server of claim 22 wherein the event processing server is further configured such that the event data includes network management data indicating a network management event associated with a source of the event data and wherein the step of receiving event data utilizes a hypertext transport protocol to receive the event data.

29. The event processing server of claim 22 wherein if the existing event information is accessible, the event processing server is further configured to:

i) provide an event data destination; and ii) receive the event data via the event data destination.

30. The event processing server of claim 29 wherein, in the steps of receiving, the event processing server is further configured to:

read first and second event data;

process the first and second event data to produce event output data that reflects a hierarchical event relationship between the first and second event data.

31. The event processing server of claim 22 wherein in the steps of creating system component status records and the step of receiving the event data the event processing server is further configured to:

update a status of the system component status record based on the event data received.

32. The event processing server of claim 22 wherein the event processing server is configured such that the event message contains event data.

33. The event processing server of claim 32 wherein the event processing server is configured such that the event message contains event registration information.

34. The event processing server of claim 22 wherein the server is further capable of maintaining a time history of a series of events related to an alarm attribute.

35. The event processing server of claim 34 wherein the server is further capable of tracking how often the attribute is down and how often the attribute is up based on said time history of a series of events related to an alarm attribute.

36. The event processing server of claim 22 wherein the event information is separate from the event data, the event data defining how the event data is processed.

37. In an event generation client, comprising:

a memory;

a communications interface;

a processor; and an interconnection mechanism coupling the memory, the processor and the communications interface;

wherein the processor is configured to:

send event registration information including identifying event information required to process event data, said event registration information further including product versions currently supported and a definition of a set of classes for said product, wherein said definition of a set of classes includes, for each class, a name, a unique identifier, a description of the class, and definitions of dynamic variables for each class, said dynamic variables including properties and alarm attributes;

detect an event;

in response to detecting an event, create event data; and send the event data to an event processing server;

receive an event rejection indicating missing event information from an event process server;

obtain the missing information; and send the missing event information to the event processing server.

38. The event generation client of claim 37 wherein, in the step of creating event data, the event generation client is further configured to include formatting the event data in a mark-up language format capable of transmission via a hyper-text transport protocol.

39. The event generation client of claim 37 wherein, in the step of sending, the event generation client if further configured to:

initiate a multiple of status checks of sources to produce status check information; and forward status check information in the event data to the event processing server.

40. The event generation client of claim 37 wherein, in the step of sending, the event generation client is further configured to:

periodically send event data to the event processing server as confirmation of an operating communications channel.

41. A computer program product that includes a computer readable medium having instructions stored thereon such that, when the instructions are carried out by a communications device, the communications device is capable of performing the steps of:

receiving an event message, the event message containing event registration information including product versions currently supported and a definition of a set of classes for said product, wherein said definition of a set of classes includes, for each class, a name, a unique identifier, a description of the class, and definitions of dynamic variables for each class, said dynamic variables including properties and alarm attributes;

identifying event information required to process event data based on the event message;

based on the event information, determining if existing event information is accessible to process the event data and if the existing event information is not accessible:

i) providing an event rejection indicating missing event information; and ii) receiving the missing event information identified in the event rejection.

42. An event processing server, for event processing, comprising:

(i) a memory;
(ii) a communications interface;
(iii) a processor;
(iv) an interconnection mechanism coupling the memory, the processor and the communications interface;
(v) means, coupled to the communications interface, for receiving an event message, the event message containing event registration information including product versions currently supported and a definition of a set of classes for said product, wherein said definition of a set of classes includes, for each class, a name, a unique identifier, a description of the class, and definitions of dynamic variables for each class, said dynamic variables including properties and alarm attributes;
(vi) means, coupled to the communications interface, for identifying event information required to process event data based on the event message;
(vii) means, coupled to the communications interface, based on the event information, for determining if existing event information is accessible to process the event data and if the existing event information is not accessible:

i) providing an event rejection indicating missing event information; and ii) receiving the missing event information identified in the event rejection.

* * * * *